(12) United States Patent
Kisch et al.

(10) Patent No.: US 7,785,433 B2
(45) Date of Patent: *Aug. 31, 2010

(54) END EFFECTOR AND METHODS FOR CONSTRUCTING COMPOSITE MEMBERS

(75) Inventors: Robert A. Kisch, Auburn, WA (US); Peter Vogeli, Seattle, WA (US); Kyle Jeffries, Everett, WA (US); Russell DeVlieg, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/756,493

(22) Filed: May 31, 2007

(65) Prior Publication Data

US 2008/0295954 A1 Dec. 4, 2008

(51) Int. Cl.
B29C 70/56 (2006.01)
B29C 53/62 (2006.01)

(52) U.S. Cl. .................. 156/166; 156/173; 156/247; 156/574

(58) Field of Classification Search .......... 156/99–107, 156/166, 173, 175, 433, 441, 425, 523, 574, 156/247

See application file for complete search history.

(56) References Cited

U.S. PATENT DOCUMENTS

| 3,983,276 | A | * | 9/1976 | Matsumoto ................ 428/40.9 |
| 4,536,438 | A | * | 8/1985 | Bishop et al. ............... 442/247 |
| 4,699,683 | A | | 10/1987 | McCowin |
| 4,772,352 | A | | 9/1988 | Kornbichler |
| 4,822,444 | A | | 4/1989 | Weingart et al. |
| 4,877,193 | A | | 10/1989 | Vaniglia |
| 5,084,221 | A | * | 1/1992 | Matsuno et al. ............. 264/103 |
| 5,223,072 | A | | 6/1993 | Brockman et al. |
| 5,518,564 | A | | 5/1996 | Darrieux |
| 6,968,883 | B2 | | 11/2005 | Martinez |
| 6,994,324 | B2 | | 2/2006 | Harvey et al. |
| 2006/0180264 | A1 | | 8/2006 | Kisch et al. |
| 2007/0125474 | A1 | * | 6/2007 | Barker et al. ................. 156/71 |

OTHER PUBLICATIONS

Aircraftspruce.com (Found at http://web.archive.org/web/20060509045132/http://www.aircraftspruce.com/catalog/cmpages/yarntow.php, a site dated May 9, 2006 found with Wayback Machine at archive.org), pp. 1-2.*
Search Report from UK Intellectual Property Office on co-pending UK application (GB0809683.6) dated Oct. 16, 2008.

* cited by examiner

Primary Examiner—Kat Wyrozebski
Assistant Examiner—Scott W Dodds
(74) Attorney, Agent, or Firm—Yee & Associates, P.C.; Brett L. Halperin

(57) ABSTRACT

An end effector, and methods for constructing composite members, in which a compaction roller and redirect rollers translate synchronously along the compaction axis. Additionally, the end effector includes an advantageous arrangement of spools and rollers that directs tow to the redirect rollers at substantially a right angle. Movement of the compaction roller along the compaction axis induces little, if any, changes in tow tension. The substantially constant tow tension advantageously reduces rewinding of the tow supply spools, which can degrade the quality of the lay up and contribute to despooling problems.

7 Claims, 6 Drawing Sheets

END EFFECTOR AND METHODS FOR CONSTRUCTING COMPOSITE MEMBERS

BACKGROUND

1. Technical Field

The present disclosure relates to apparatus and methods for constructing composite members.

2. Description of Related Art

Composite items are typically constructed from layers of material that are laminated together. Some categories of materials used to fabricate composite items include fiber, fabric, tape, film and foil, and each of these categories includes a multitude of diverse materials. For example, typical fibers include glass, carbon, aramid, and quartz. When these fibers are arranged as woven sheets and unidirectional ribbons, they are referred to as fabric and tape, respectively.

Material placement is a process used to construct or fabricate composite items. These composite items include relatively simple planar sheets or panels to relatively large complex structures. Many composite items are built up from multiple layers or plies of composite materials. Some composite materials may be pre-impregnated with uncured resin ("prepreg") or another binding agent.

In some applications an end effector of a machine for fabricating composite members arrays a group of prepreg tows into a continuous band and then presses them against the surface of a workpiece. Generally a compaction roller performs the task of pressing the tows against the workpiece. To accommodate misalignments between the end effector and the work-piece and elevation variations on the surface of the workpiece the compaction roller is generally movable toward and away from the end effector. Unfortunately, movement of the compaction roller tends to reduce tension in the tows., which can cause rewinding of the spools that supply the tow, can degrade the quality of the lay-up and can contribute to despooling problems.

SUMMARY

The preferred embodiments of the present end effector and methods for constructing composite members have several features, no single one of which is solely responsible for their desirable attributes. Without limiting the scope of this end effector and these methods as expressed by the claims that follow, their more prominent features will now be discussed briefly. After considering this discussion, and particularly after reading the section entitled "Detailed Description of the Preferred Embodiments", one will understand how the features of the preferred embodiments provide advantages, which include decreased complexity and cost as compared to prior art end effectors.

One embodiment of the present end effector for constructing composite members comprises an end effector that is configured to apply tow to a composite workpiece. The end effector comprises at least one tow supply spool for supplying tow; at least one redirect roller for changing a direction of travel of the tow; and at least one compaction roller configured to press the tow against the workpiece. The redirect roller and the compaction roller are configured to translate together along a compaction axis of the end effector, and are constrained from translating relative to one another. A direction of travel of the tow toward the redirect roller lies at substantially a right angle to the compaction axis.

One embodiment of the present methods for constructing composite members comprises the steps of: applying tow to a composite workpiece using an end effector; compacting the tow against the workpiece using a compaction roller; redirecting the tow toward the compaction roller using a redirect roller; translating the compaction roller and the redirect roller together along a compaction axis of the end effector; and feeding the tow toward the redirect roller at substantially a right angle to the compaction axis. The redirect roller and the compaction roller are constrained from translating relative to one another.

Another embodiment of the present end effector for constructing composite members comprises a method of manufacturing an aircraft, the method including at least a pre-production phase and a production phase. The method comprises the steps of: designing the aircraft, including subassemblies, and components therefor; specifying and procuring materials; fabricating the components from the materials; assembling the subassemblies by combining subsets of the components; and assembling the aircraft by combining subsets of the subassemblies. The step of assembling the subassemblies includes the step of fabricating a composite workpiece according to the method described in the paragraph above.

BRIEF DESCRIPTION OF THE DRAWINGS

The preferred embodiments of the present end effector and methods for constructing composite members will now be discussed in detail with an emphasis on highlighting the advantageous features. These embodiments depict the novel and non-obvious end effector and methods shown in the accompanying drawings, which are for illustrative purposes only. These drawings include the following figures, in which like numerals indicate like parts.

DETAILED DESCRIPTION

Figure 1:
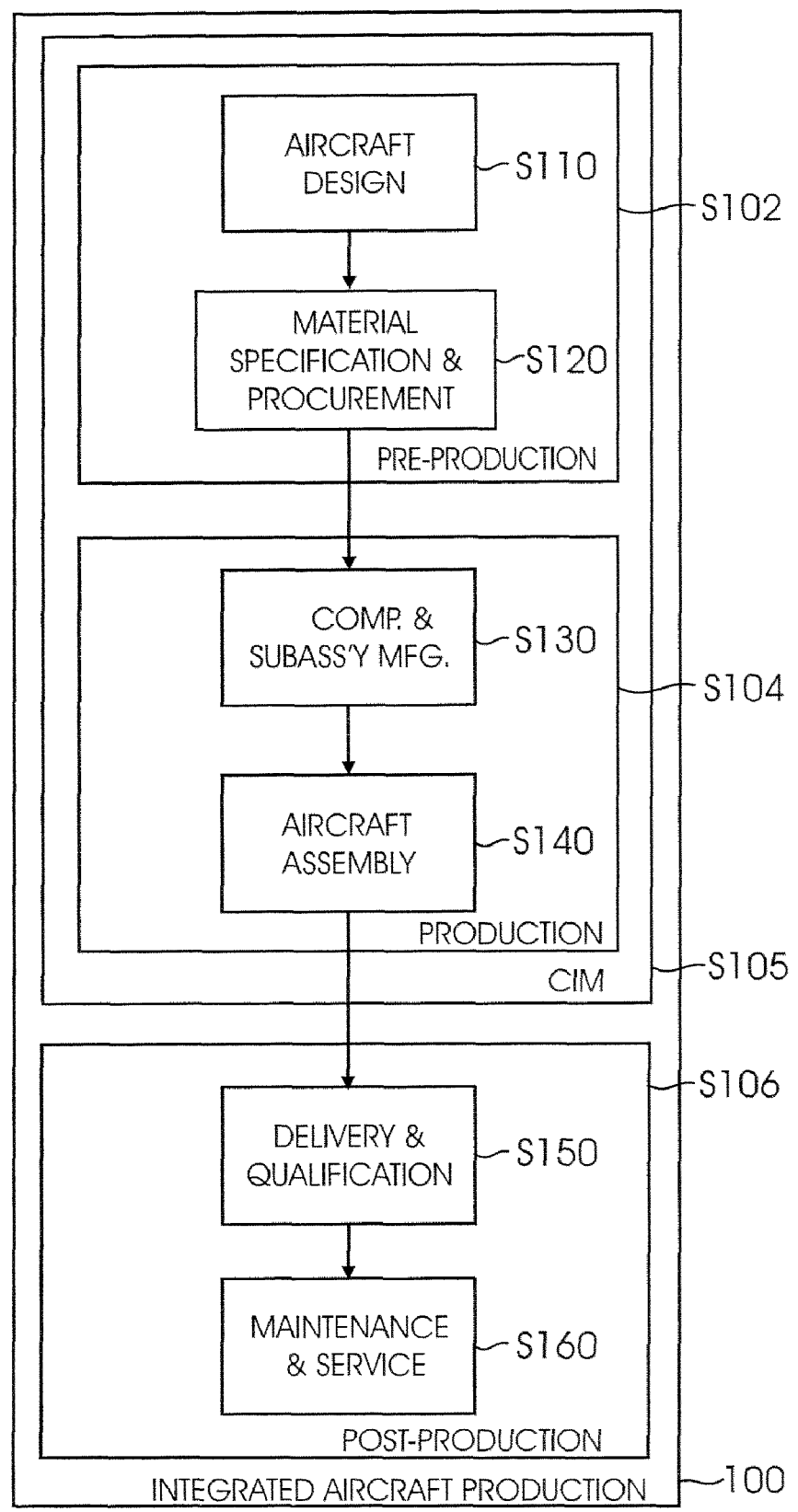
FIG. 1 is a flowchart illustrating steps in an integrated aircraft production process.

FIG. 1 illustrates an integrated aircraft production process 100, in accordance with embodiments of the present disclosure. As used herein, the integrated aircraft production process 100 also may include manufacturing support, or both. Typically, the process 100 includes a pre-production phase S102, a production phase S104, and a post-production phase S106. The pre-production phase S102 may include aircraft design S110, including design of subassemblies and components, and material specification and procurement S 120. Material specification and procurement S120 may include selection and procurement of components fabricated, or subassemblies manufactured, by third parties. Examples of such third parties include, without limitation., vendors, subcontractors, and suppliers. The production phase S104 may include component fabrication and/or subassembly manufacturing S130, and aircraft assembly S140. The pre-production phase S102 and production phase S104 can be elements of an integrated manufacturing process S105, including one or more of aircraft and component design, development, and simulation processes; material, component, and sub-assembly specification and procurement processes; automated production planning processes; fabrication and assembly processes; and quality control processes.

Frequently, aspects of a modern aircraft production process, such as the integrated process 100, do not end with final assembly, but may extend over the service life of an aircraft. These aspects may involve iterative and interactive collaborations between manufacturer, governmental authorities, customers and aircraft operators. Accordingly, the integrated production process 100 can include a post-production phase S106. The post-production phase S106 may include aircraft delivery and qualification S150, and/or aircraft maintenance and service S160. The aircraft delivery and qualification S150 may include providing an aircraft to customer specifications, which may have changed from the time the aircraft was assembled. Thus, delivery and qualification can include repair, modification, and/or revision of one or more elements of the aircraft after delivery to a customer or operator. Also, it may be desirable to perform a modification, maintenance, a repair, and/or an upgrade to an aircraft in the service interval between aircraft delivery and retirement. Therefore, aircraft maintenance and service S160 can include repair, maintenance, modification, and/or upgrade of a portion of an airframe, including an airframe manufactured or assembled using traditional, pre-existing materials, components, and/or subassemblies.

Figure 2:
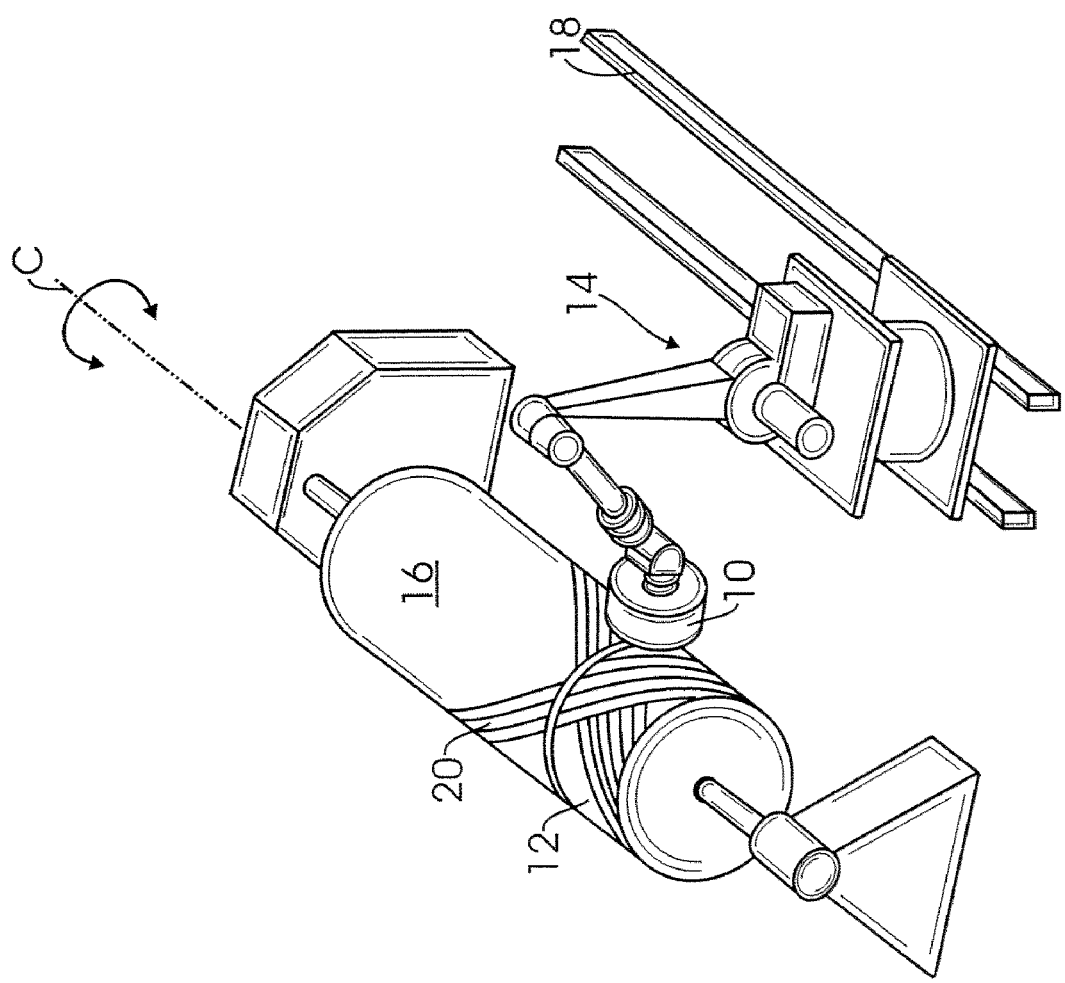
FIG. 2 is a front perspective view of one embodiment of the present end effector and positioning apparatus for the end effector, illustrating the end effector applying course material to a workpiece.
Figure 3:
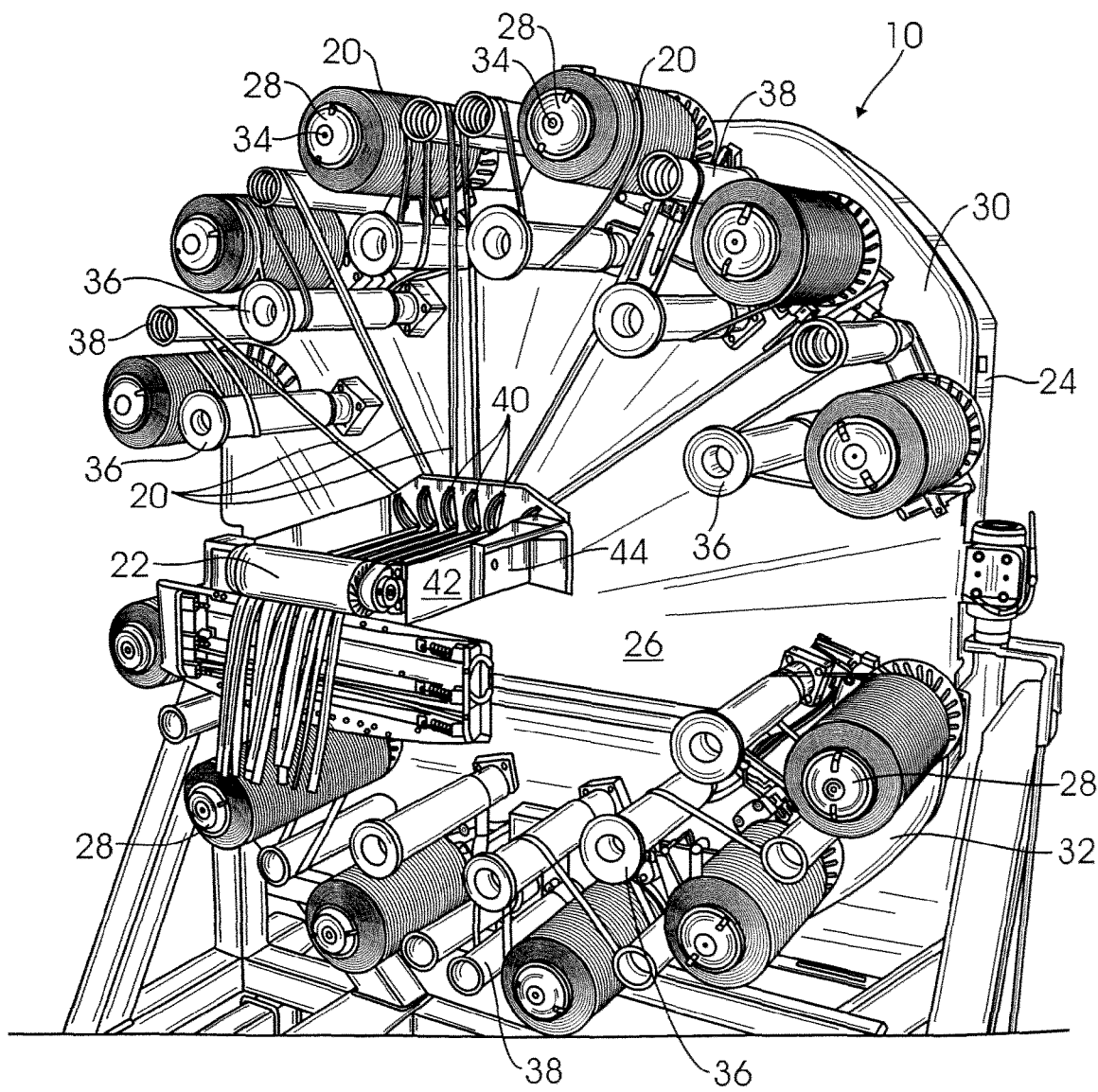
FIG. 3 is a front perspective view of one embodiment of the present end effector.
Figure 4:
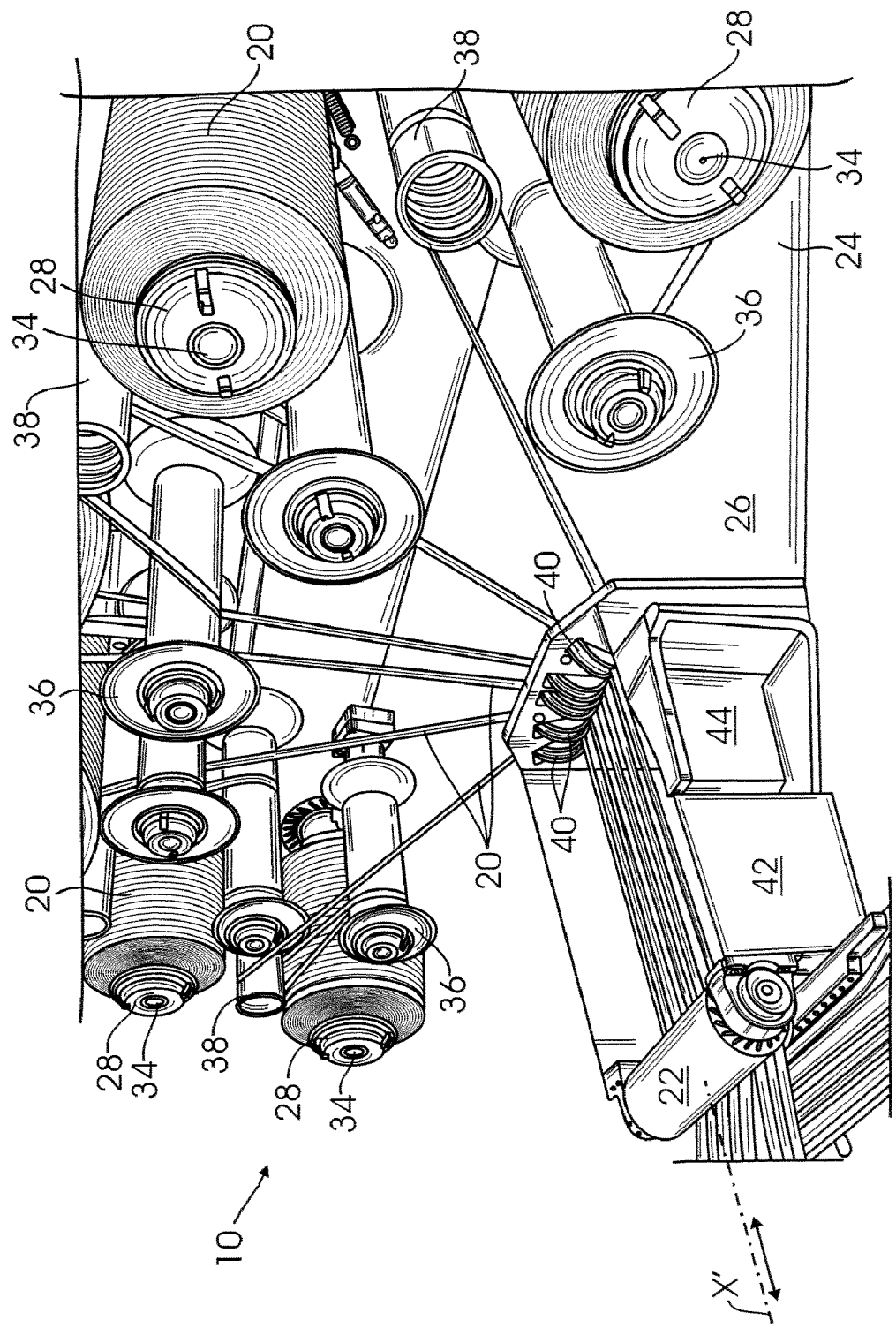
FIG. 4 is a detail front perspective view of the end effector of FIG. 3.

FIGS. 2-4 illustrate one embodiment of the present end effector 10 for constructing a composite member 12, and positioning apparatus 14 for the end effector 10. With reference to FIG. 2, the positioning apparatus 14 is configured to position and/or control the movement of the end effector 10 with respect to a composite workpiece 16. In the illustrated embodiment, the positioning apparatus 14 is a robotic armature or gantry-type positioning apparatus that is movable along a track 18. The positioning apparatus 14 may be configured to provide the end effector 10 with three to ten or more degrees of freedom. However, those of ordinary skill in the art will appreciate that the positioning apparatus 14 may embody virtually any configuration, and may provide the end effector 10 with any number of degrees of freedom. In fact, in some embodiments the end effector 10 may be stationary. The configuration of the positioning apparatus 14, and in fact the provision of positioning apparatus 14, is not critical to the present embodiments.

The end effector 10 is configured to fabricate a composite member 12 by applying course material 20 to a composite workpiece 16. The course material 20 may comprise, for example, tow, prepreg tow, slit tape, slit tape tow, tape, fibers, fiber tows, films, foils. etc. Particular examples of fibers include glass, aramid, carbon, and various other fibers. The tow may include individual fibers, bundles, cords, plaits, ribbons in the form of unidirectional "tape", woven fabric, biaxial cloth, etc. The material may be dry or wet or preimpregnated with resin or another binding substance. The tow may also include a backing or separator film that substantially prevents the tow from adhering to itself while it is on the spool or in roll form. Those of ordinary skill in the art will appreciate that in certain embodiments the tow may not include a backing. For simplicity, the description of the present embodiments will use the term "tow" to describe the material applied to the workpiece 16. However, as used herein, including in the claims below, the term "tow" shall be understood to be synonymous with "course material". Those of ordinary skill in the art will appreciate that the material used is not critical to the present embodiments.

Depending upon the material characteristics of the tow 20, it may be advantageous to control environmental variables such as, for example, temperature and humidity. In addition, based on manufacturer's specifications and/or empirically derived data, the storage and/or application conditions for the tow 20 may differ from one application to another. Therefore, in some embodiments the end effector 10 may include a housing (not shown) that encloses the tow 20. The end effector 10 may also include environmental control assemblies (not shown) such as a heater and/or chiller.

Typically, the composite member 12 is fabricated from multiple plies or layers of tow 20, as illustrated in FIG. 2. Thus, the workpiece 16 includes the workpiece surface itself and/or any previously applied layers of tow 20. As shown in FIGS. 3 and 4, the end effector 10 includes a cylindrical compaction roller 22 that presses the tow 20 against the workpiece 16. The workpiece 16 is configured to provide a suitably stable and finished surface for ply placement. Characteristics of the workpiece 16, such as size, shape, contour, and the like, are based upon design parameters of the composite member 12 to be fabricated.

As shown in FIG. 2, the workpiece 16 may be controlled to rotate about an axis C, and in such embodiments the workpiece 16 is typically referred to as a mandrel. In other embodiments, the workpiece 16 may be stationary or controlled to move along and/or about various axes. For example, the workpiece 16 may be secured to a sliding table, or X-Y table (not shown). The movement of the workpiece 16 and/or the positioning apparatus 14 acts to position the end effector 10 with respect to the workpieece 16. Furthermore, the movement of the workpiece 16 and the positioning apparatus 14 may be coordinated to such a degree that the devices operate much like a single unit. However, those of ordinary skill in the art will appreciate that movement of the workpiece 16 is not critical to the present embodiments.

FIGS. 3 and 4 provide front perspective views of one embodiment of the present end effector 10. With reference to FIG. 3, in the illustrated embodiment the end effector 10 comprises a support structure 24 including a substantially flat support panel 26. A plurality of tow supply spools 28 are arranged radially about the support panel 26. Although twelve tow supply spools 28 are shown, those of ordinary skill in the art will appreciate that fewer or more may be provided. In the illustrated embodiment, six tow supply spools 28 are provided in an upper portion 30 of the end effector 10 and six tow supply spools 28 are provided in a lower portion 32 of the end effector 10. For simplicity, the discussion herein will focus on the six upper tow supply spools 28. Those of ordinary skill in the art will appreciate, however, that characteristics of the upper tow supply spools described herein may also apply to the six lower tow supply spools.

Each cylindrical tow supply spool 28 is mounted to a spindle 34 and includes a helically wound supply of tow 20. As tow 20 is drawn off each spool 28 to be supplied to the work-piece 16, the tow supply spool 28 rotates about its spindle 34. Each spindle 34 may include a tensioner (not shown), such as a brake, that assists in maintaining a desired tension in the tow 20. For example, a suitable tensioning device may include a belt (not shown) that wraps around a portion of the circumference of the spindle 34 and generates friction that retards the rotation of the spindle 34. The friction may be modulated by a solenoid or a servo acting upon the belt. Advantageously, the spindles 34 do not require bi-directional movement or complicated rewind apparatus in order to maintain tension, as explained in detail below.

With reference to FIG. 3, in the illustrated embodiment the end effector 10 further comprises a plurality of backing take-up spools 36, a plurality of dancer rollers 38 and a plurality of redirect rollers 40. Each of the backing take-up spools 36, dancer rollers 38 and redirect rollers 40 spins freely on an axle or spindle (not shown). One backing take-up spool 36, one dancer roller 38 and one redirect roller 40 is provided for each tow supply spool 28. However, in FIGS. 3 and 4 the lower redirect rollers 40 and associated support structures have been omitted for clarity. The backing take-up spools 36 and dancer rollers 38 are located closely adjacent their respective tow supply spools 28 and the redirect rollers 40 are located in a cluster near a center of the support panel 26. Each length of tow 20 follows a set path about the spools and rollers as follows. Each path of tow travel begins as the tow 20 leaves its respective supply spool 28, continues around its respective backing take-up spool 36, then around its respective dancer roller 38 and then to its respective redirect roller 40.

As each tow 20 travels around its respective backing take-up spool 36 the backing (not shown) separates from the tow 20 and winds onto the take-up spool 36. As explained above, in certain embodiments the tow 20 may not include a backing. In such embodiments the backing take-up spools 36 may not be present, or they may be present but unused. Those of ordinary skill in the art will appreciate that alternative apparatus may be provided for separating the tow 20 from its backing. For example, one such apparatus includes a vacuum nozzle (not shown) in fluid communication with a vacuum source and configured to generate sufficient suction to draw off the tow backing. Such apparatus is disclosed in U.S. Patent Application Publication No. 2006/0180264 entitled "Modular Head Lamination Device and Method", the entire contents of which are hereby incorporated by reference.

Figure 5:
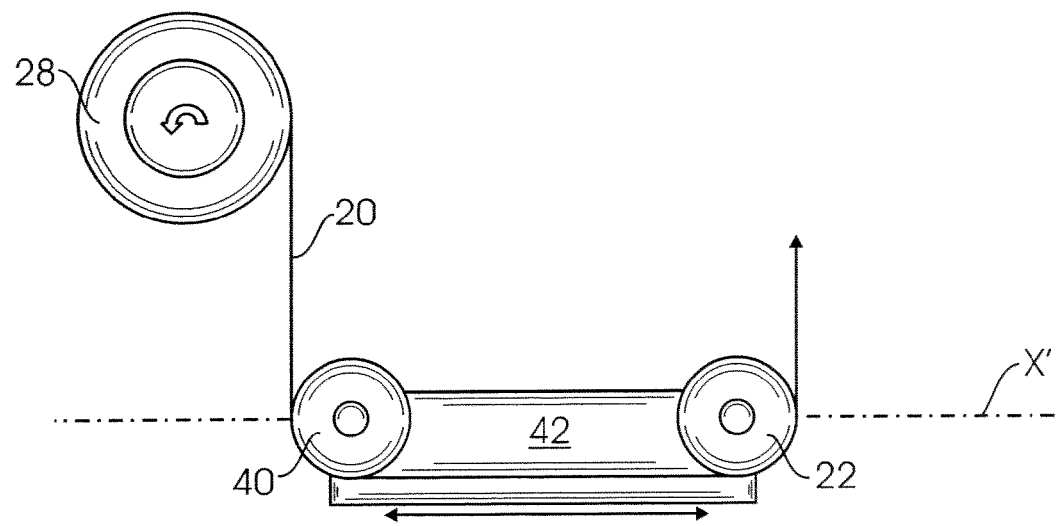
FIG. 5 is a schematic representation of relative locations and movement capabilities of the spools and rollers of one embodiment of the present end effector.

After the tow 20 and backing are separated, the tow 20 continues around its respective dancer roller 38. The dancer roller 38 advantageously dampens any rapid changes in the feed rate of the tow 20. The dancer roller 38 also facilitates a smooth removal of the tow 20 from the spool 28, and directs the path of tow travel toward its respective redirect roller 40. The tow 20 travels around its respective redirect roller 40 and toward the compaction roller 22. The path of tow travel from the redirect rollers 40 to the compaction roller 22 extends along an axis X', known as a compaction axis or compliance axis (FIGS. 4 and 5). Along this axis the tow 20 may be directed past one or more optional components such as, for example, combs, cutting assemblies, clamps, dancers, idlers, etc.

With reference to FIGS. 3 and 4, the configuration of the end effector 10, with the tow supply spools 28 arranged radially around the redirect rollers 40, feeds each tow 20 to its respective redirect roller 40 at substantially a right angle to the compaction axis X'. Thus, one step in one embodiment of the present methods comprises feeding the tow 20 to the redirect roller(s) 40 at substantially a right angle to the compaction axis X', as illustrated in step S700 of FIG. 7. The right angle feed, which is illustrated schematically in FIG. 5, advantageously contributes to a substantially constant tension in each tow 20, as described in detail below. The redirect roller(s) 40 redirect the tow 20 toward the compaction roller 22, as illustrated in step S702 of FIG. 7.

Figure 7:
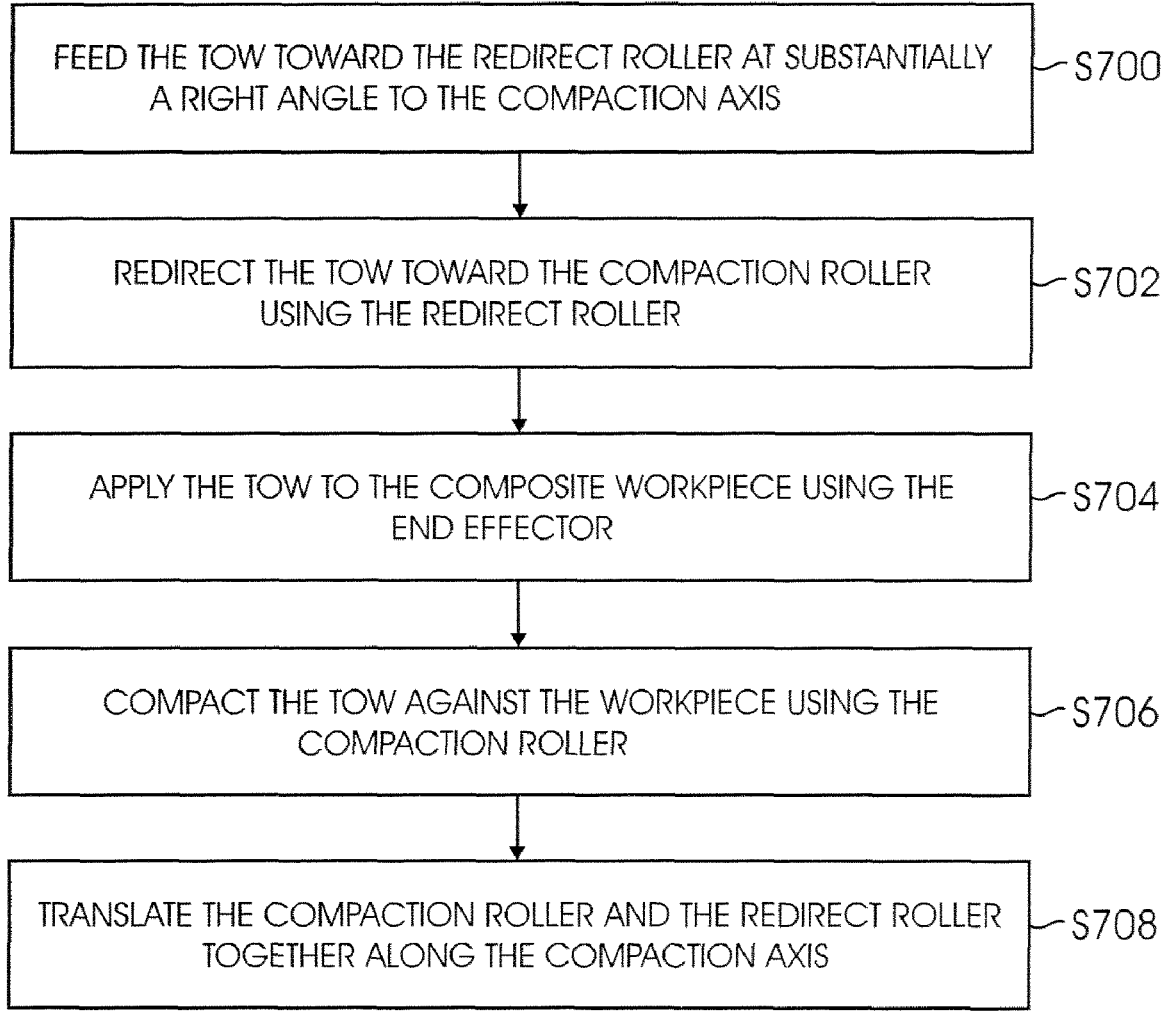
FIG. 7 is a flowchart illustrating one embodiment of the present methods for constructing a composite member.

As tow 20 is dispensed from the end effector 10 and applied to the workpiece 16, as illustrated in step S704 of FIG. 7, the compaction roller 22 presses the tow 20 against the workpiece 16, as illustrated in step S706. From time to time the workpiece 16 and the end effector 10 may become misaligned and/or the surface of the work-piece 16 may become uneven, such as through unanticipated tow buildup. In order to accommodate these misalignments and uneven surfaces, the compaction roller 22 is configured to be translatable along the compaction axis X' (FIG. 4) relative to the end effector 10. For example, the compaction roller 22 may be translatable plus or minus 1 to 20 mm along the compaction axis X', as indicated by the double-headed arrow in FIG. 5. Thus, as the compaction roller 22 travels over the surface of the workpiece 16 it may translate back and forth along the compaction axis X' in response to misalignments and uneven surfaces. To accommodate this translation, the compaction roller 22 is mounted on a compaction roller subassembly 42 (FIGS. 3-5) that is slidably secured to a pair of brackets 44 that are in turn secured to the support structure 24. Only one of the brackets 44 is visible in FIGS. 3 and 4, and for clarity the structure that secures the brackets 44 to the support structure 24 has been omitted. The brackets 44 may be stationary with respect to the support structure 24, or they may be capable of relative movement. The compaction roller subassembly 42 is urged toward the workpiece 16 by, for example, one or more pneumatic cylinders (not shown). Those of ordinary skill in the art will appreciate that alternative apparatus may be used to urge the compaction roller subassembly 42 toward the work-piece 16.

As illustrated in FIG. 4, in the present embodiments the redirect rollers 40 are advantageously mounted to the compaction roller subassembly 42. This configuration is also shown schematically in FIG. 5. In FIG. 5 only one redirect roller 40 is shown, and represents the multiple redirect rollers shown in FIG. 4. As shown, the redirect rollers 40 are mounted at an upstream end of the compaction roller subassembly 42 and the compaction roller 22 is mounted at a downstream end of the subassembly 42. Because the redirect rollers 40 and the compaction roller 22 are both mounted to the compaction roller subassembly 42, they are constrained from moving relative to one another. They translate as a unit in both directions along the compaction axis X', as illustrated by the double-headed arrow in FIG. 5. Thus, as the compaction roller 22 travels over the surface of the workpiece 16 and translates back and forth along the compaction axis X' as described above, the redirect rollers 40 translate along the compaction axis X' in sync with the compaction roller 22, as illustrated in step S708 of FIG. 7. This simultaneous movement of the compaction roller 22 and the redirect rollers 40, coupled with the substantially ninety-degree feed angle of the tow 20 to the redirect rollers 40, advantageously maintains a nearly constant tension within the tow 20.

In prior art apparatus for constructing composite members, movement of the compaction roller along the compaction axis disadvantageously lowers tension in each tow. The present embodiments reduce or eliminate such tension losses by feeding the tow 20 to the redirect rollers 40 at a substantially ninety-degree feed angle to the compaction axis, coupled with synchronous movement of the compaction roller 22 and the redirect rollers 40 along the compaction axis X'. As the compaction roller 22 moves relative to the end effector 10, the redirect rollers 40 move along with it. Thus, tension in the region of the tow path between the redirect rollers 40 and the compaction roller 22 remains substantially constant. And because the tow 20 is fed to the redirect rollers 40 at a substantially ninety-degree angle to the compaction axis, movement of the redirect rollers 40 with respect to the tow supply spools 28 does not generate any significant variations in tension in the region of the tow path between the tow supply spools 28 and the redirect rollers 40. The reduction or elimination of these variations in tow tension enable the present embodiments to produce high-quality composite members 12 without the need for complex and expensive bi-directional tow supply spools and rewind apparatus. The overall cost and complexity of the end effector 10 are thus reduced.

Figure 6:
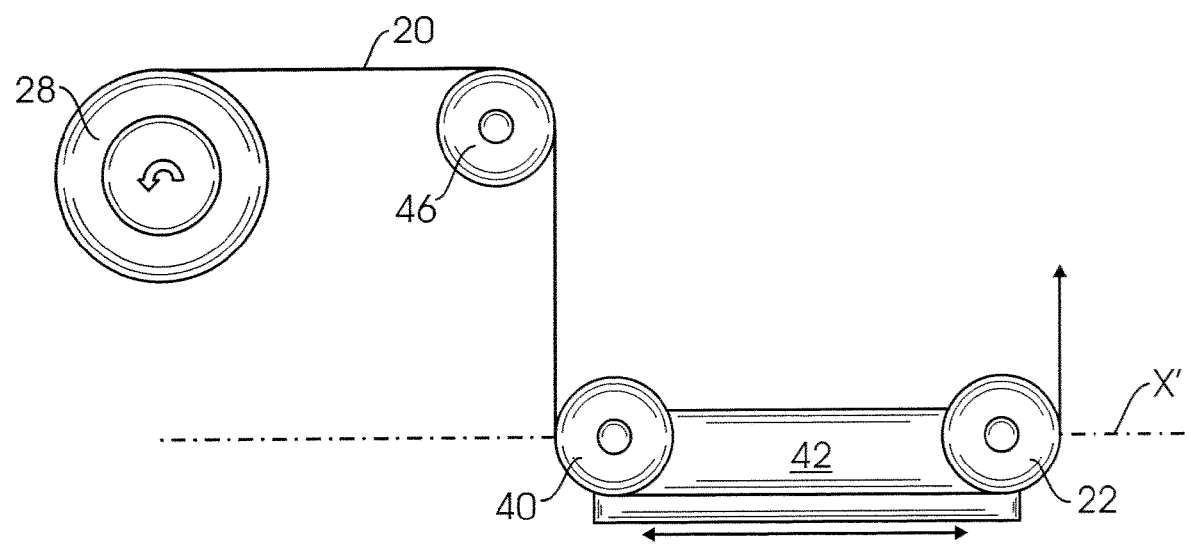
FIG. 6 is a schematic representation of relative locations and movement capabilities of the spools and rollers of another embodiment of the present end effector.

Those of ordinary skill in the art will appreciate that the present embodiments are susceptible to many variations that are nevertheless within the scope of the claims below. For example, additional rollers may be added to the end effector 10 to suit particular applications. FIG. 6 illustrates, schematically, one such alternative embodiment including a second redirect roller 46. While only one second redirect roller 46 is shown in FIG. 6, those of ordinary skill in the art will appreciate that a plurality of second redirect rollers 46 may be provided. The second redirect roller 46 is located between the tow supply spool 28 and the first redirect roller 40. Tow 20 is fed from the tow supply spool 28 around the second redirect roller 46 to the first redirect roller 40. Advantageously, the configuration of FIG. 6 maintains the substantially ninety-degree tow feed angle to the first redirect roller 40 and the synchronous movement of the first redirect roller 40 with the compaction roller 22.

The above description presents the best mode contemplated for carrying out the present end effector for constructing composite members, and of the manner and process of making and using it, in such full, clear, concise, and exact terms as to enable any person skilled in the art to which it pertains to make and use this end effector. This end effector is, however, susceptible to modifications and alternate constructions from that discussed above that are fully equivalent. Consequently, this end effector is not limited to the particular embodiments disclosed. On the contrary, this end effector covers all modifications and alternate constructions coming within the spirit and scope of the end effector as generally expressed by the following claims, which particularly point out and distinctly claim the subject matter of the end effector.

What is claimed is:

1. A method of fabricating a composite member, the method comprising the steps of:
   applying a plurality of tow to a composite workpiece using an end effector;
   compacting the plurality of tow against the workpiece using a compaction roller;
   redirecting the plurality of tow toward the compaction roller using a plurality of redirect rollers;
   translating the compaction roller and the plurality of redirect rollers together in each direction along a compaction axis of the end effector while dispensing the plurality of tow from the end effector;
   feeding each tow of the plurality of tow toward each redirect roller of the plurality of redirect rollers at substantially a right angle to the compaction axis, in which the plurality of redirect rollers and the compaction roller translate relative to the end effector and are constrained from translating relative to one another; and
   feeding the plurality of tow toward the compaction roller.

2. The method of claim 1, further comprising the step of directing the plurality of tow around a backing take-up spool to separate a backing from the plurality of tow.

3. The method of claim 1, further comprising the step of directing the plurality of tow around a dancer roller to assist in maintaining tension in the plurality of tow.

4. The method of claim 1, further comprising the step of directing the plurality of tow around a second redirect roller.

5. The method of claim 1, further comprising the step of designing the composite member.

6. The method of claim 1, further comprising the step of installing the completed composite member upon an aircraft.

7. The method of claim 1, wherein the composite member is installed upon the aircraft during a repair or improvement process.

* * * * *